(12) United States Patent
Kim et al.

(10) Patent No.: US 12,318,346 B2
(45) Date of Patent: Jun. 3, 2025

(54) CONTROLLER, CRUTCH AND WEARABLE ROBOT INCLUDING THE SAME

(71) Applicants: Hyundai Motor Company, Seoul (KR); Kia Corporation, Seoul (KR)

(72) Inventors: Kyu Jung Kim, Seoul (KR); Hyun Seop Lim, Gyeonggi-do (KR); Sang In Park, Gyeonggi-do (KR); Ju Young Yoon, Gyeonggi-do (KR); Beom Su Kim, Gyeonggi-do (KR); Dong Jin Hyun, Gyeonggi-do (KR); Ki Hyeon Bae, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 874 days.

(21) Appl. No.: 17/516,196

(22) Filed: Nov. 1, 2021

(65) Prior Publication Data

US 2022/0241133 A1    Aug. 4, 2022

(30) Foreign Application Priority Data

Feb. 3, 2021    (KR) .......................... 10-2021-0015686

(51) Int. Cl.
*A61H 3/02*    (2006.01)
*A61H 3/00*    (2006.01)
*G06F 3/02*    (2006.01)

(52) U.S. Cl.
CPC ................ *A61H 3/02* (2013.01); *A61H 3/00* (2013.01); *G06F 3/02* (2013.01); *A61H 2201/5028* (2013.01)

(58) Field of Classification Search
CPC .... A61H 3/02; A61H 3/00; A61H 2201/5028; A61H 2201/165; A61H 2201/1659;
(Continued)

(56) References Cited

U.S. PATENT DOCUMENTS

| 4,858,125 A | * | 8/1989 | Washizuka | ............. A61H 3/061 |
| | | | | 135/65 |
| D388,837 S | * | 1/1998 | Lee | ............................... D14/416 |

(Continued)

FOREIGN PATENT DOCUMENTS

| JP | 2002-191654 A | 7/2002 |
| JP | 2012-024201 A | 2/2012 |

(Continued)

*Primary Examiner* — Victoria Murphy
*Assistant Examiner* — Kris Hanyu Gong
(74) *Attorney, Agent, or Firm* — Fox Rothschild LLP

(57) ABSTRACT

A controller includes: a head part including a display unit providing information and images and a button unit having operation buttons; and a body part joined to the head part, where the display unit includes a projection portion engaged with the body part, the body part includes a recessed portion into which the projection portion is inserted, a first uneven portion is provided on an outer circumferential surface of the projection portion, a second uneven portion having a shape corresponding to that of the first uneven portion is provided on an inner circumferential surface of the recessed portion, and at least one of the first uneven portion or the second uneven portion includes a plurality of uneven portions.

16 Claims, 9 Drawing Sheets

(58) Field of Classification Search
CPC .... A61H 2201/5025; A61H 2201/5043; A61H 2003/007; A61H 2201/50; G06F 3/02; G06F 3/014; B25J 9/0006; B25J 11/00; B25J 13/02; B25J 5/06; A45B 3/00
See application file for complete search history.

(56) References Cited

U.S. PATENT DOCUMENTS

| | | | |
|---|---|---|---|
| 9,158,376 | B2 | 10/2015 | Kazerooni et al. |
| 9,918,893 | B1 * | 3/2018 | Wanderman ............. A61H 3/02 |
| 10,136,841 | B2 * | 11/2018 | Alghazi ................. A61B 5/11 |
| 10,235,870 | B2 * | 3/2019 | Leason ................ H05K 5/0017 |
| 10,624,809 | B2 | 4/2020 | Tsai et al. |
| 11,191,695 | B2 | 12/2021 | Kim et al. |
| 2013/0158445 | A1 * | 6/2013 | Kazerooni ............... A61H 3/00 601/35 |
| 2013/0276844 | A1 * | 10/2013 | Moulton ................ A61H 3/04 81/489 |
| 2019/0133866 | A1 | 5/2019 | Tsai et al. |
| 2020/0078256 | A1 | 3/2020 | Kim et al. |

FOREIGN PATENT DOCUMENTS

| | | |
|---|---|---|
| JP | 2019-084335 A | 6/2019 |
| KR | 10-2020-0028220 A | 3/2020 |

* cited by examiner

CONTROLLER, CRUTCH AND WEARABLE ROBOT INCLUDING THE SAME

CROSS-REFERENCE TO RELATED APPLICATION

This application claims under 35 U.S.C. § 119(a) the benefit of Korean Patent Application No. 10-2021-0015686, filed on Feb. 3, 2021 in the Korean Intellectual Property Office, the entire contents of which are incorporated by reference herein.

BACKGROUND

(a) Technical Field

The present disclosure relates to a controller, a crutch, and a wearable robot including the same.

(b) Description of the Related Art

A wearable robot equipped with an exoskeleton that can be worn by a human operator often includes a controller for controlling the exoskeleton. For example, a wearable robot equipped with an exoskeleton for the physically challenged is provided with a crutch for supporting the weight of a user, and a controller is connected to the crutch.

According to the related art, since the controller is fixed to the crutch in a single form, it may be difficult to provide a grip of the controller optimized for each user.

In addition, according to the related art, since the controller is fixed to the crutch in a single form, it may cause malfunction of the controller depending on the user.

SUMMARY

An aspect of the present disclosure provides a controller having a structure that may be fixed in various forms depending on a user, thereby improving the user's grip and preventing malfunction of the controller.

According to an aspect of the present disclosure, a controller may include: a head part including a display unit providing information and images and a button unit having operation buttons; and a body part joined to the head part, wherein the display unit may include a projection portion engaged with the body part, the body part may include a recessed portion into which the projection portion is inserted, a first uneven portion may be provided on an outer circumferential surface of the projection portion, a second uneven portion having a shape corresponding to that of the first uneven portion may be provided on an inner circumferential surface of the recessed portion, and at least one of the first uneven portion or the second uneven portion may include a plurality of uneven portions.

The second uneven portion may include the plurality of uneven portions, and the first uneven portion may include a single uneven portion.

The display unit may further include a ball plunger provided on the outer circumferential surface of the projection portion and disposed closer to the body part than the first uneven portion.

The button unit may protrude from a side surface of the display unit, the button unit may include a plurality of stepped areas protruding from the side surface of the display unit, and the buttons may be provided on top surfaces of the plurality of stepped areas, respectively.

When a direction in which the stepped areas are spaced apart from the display unit is referred to as a first direction, the stepped areas may include: a first stepped area extending from the display unit; a second stepped area extending from the first stepped area in the first direction; and a third stepped area extending from the second stepped area in the first direction, and the buttons may include: a first button provided on the top surface of the first stepped area; a second button provided on the top surface of the second stepped area; and a third button provided on the top surface of the third stepped area.

The top surfaces of the first to third stepped areas may be inclined downward in the first direction.

The top surfaces of the first to third stepped areas may be inclined downward in a second direction in which the body part is directed toward the display unit.

A degree of inclination of the top surface of the third stepped area downward in the second direction may be greater than that of the top surface of the second stepped area, and a degree of inclination of the top surface of the second stepped area downward in the second direction may be greater than that of the top surface of the first stepped area.

The first button may be movable in a vertical direction with respect to the top surface of the first stepped area.

The second button may be a scroll wheel button.

The third button may have a hinge structure which is rotatable on a rotation axis.

The body part may include: a main body; and a first protrusion provided on a circumferential surface of the main body, extending in longitudinal and circumferential directions of the main body, and having a spiral shape.

The body part may further include a second protrusion provided on one end portion of the main body in a direction opposite to the second direction, and extending along the circumferential direction of the main body.

One end portion of the main body in the direction opposite to the second direction may have a plurality of recesses arranged in the second direction, and the second protrusion may be detachably attached to the main body through the plurality of recesses.

The body part may further include a third protrusion provided on the other end portion of the main body in the second direction, and extending along the circumferential direction of the main body.

The second stepped area may be stepped downward from the first stepped area, and the third stepped area may be stepped downward from the second stepped area.

According to another aspect of the present disclosure, a crutch for supporting a user may include: a controller; and a crutch body to which the controller is fixed, wherein the controller may include: a head part including a display unit providing information and images and a button unit having operation buttons; and a body part joined to the head part, the display unit may include a projection portion engaged with the body part, the body part may include a recessed portion into which the projection portion is inserted, a first uneven portion may be provided on an outer circumferential surface of the projection portion, a second uneven portion having a shape corresponding to that of the first uneven portion may be provided on an inner circumferential surface of the recessed portion, and at least one of the first uneven portion or the second uneven portion may include a plurality of uneven portions.

According to another aspect of the present disclosure, a wearable robot may include: a crutch including a controller, and a crutch body to which the controller is fixed; and an exoskeleton driven by the controller and worn by a user, wherein the controller may include: a head part including a display unit providing information and images and a button unit having operation buttons; and a body part joined to the head part, the display unit may include a projection portion engaged with the body part, the body part may include a recessed portion into which the projection portion is inserted, a first uneven portion may be provided on an outer circumferential surface of the projection portion, a second uneven portion having a shape corresponding to that of the first uneven portion may be provided on an inner circumferential surface of the recessed portion, and at least one of the first uneven portion or the second uneven portion may include a plurality of uneven portions.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a controller, a crutch, and a wearable robot according to exemplary embodiments of the present disclosure will be described in detail with reference to the accompanying drawings.

Controller

Figure 1:
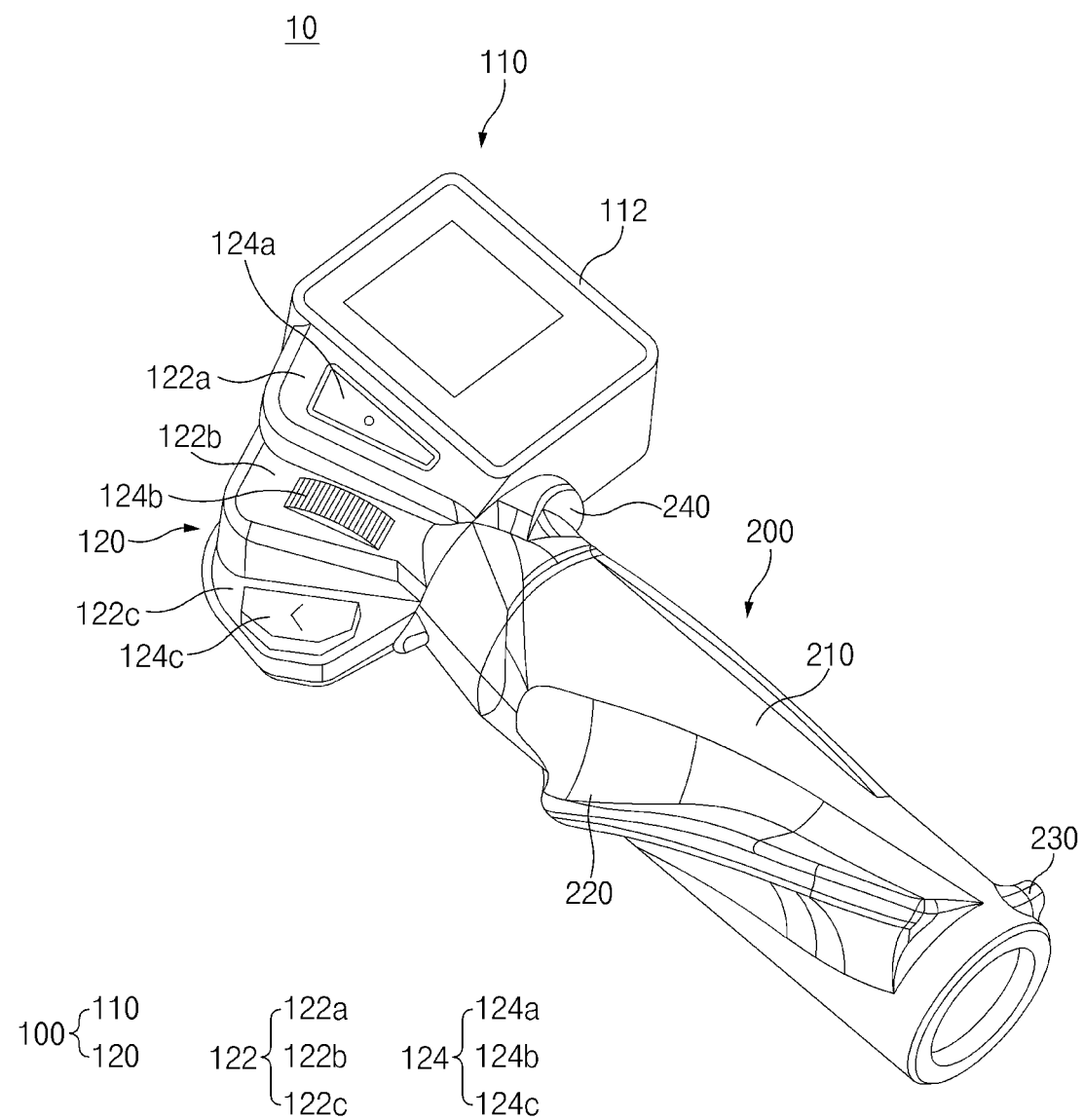
FIG. 1 illustrates a first perspective view of a controller according to an exemplary embodiment of the present disclosure.
Figure 2:
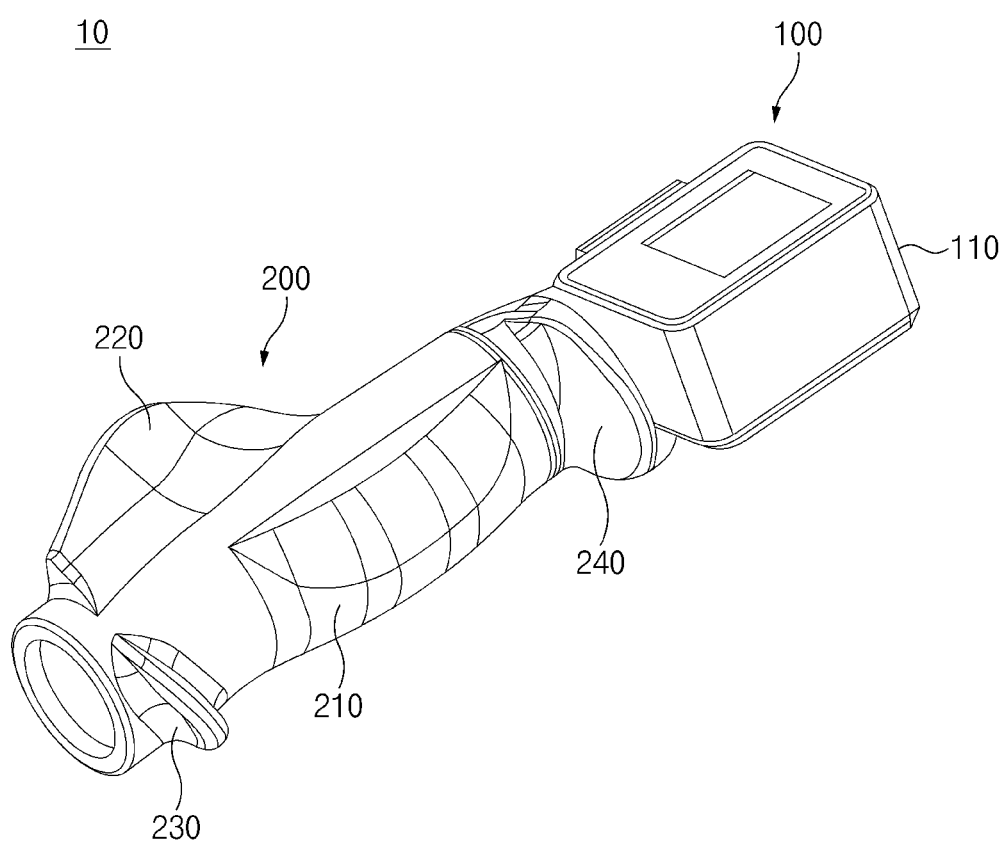
FIG. 2 illustrates a second perspective view of a controller according to an exemplary embodiment of the present disclosure.
Figure 3:
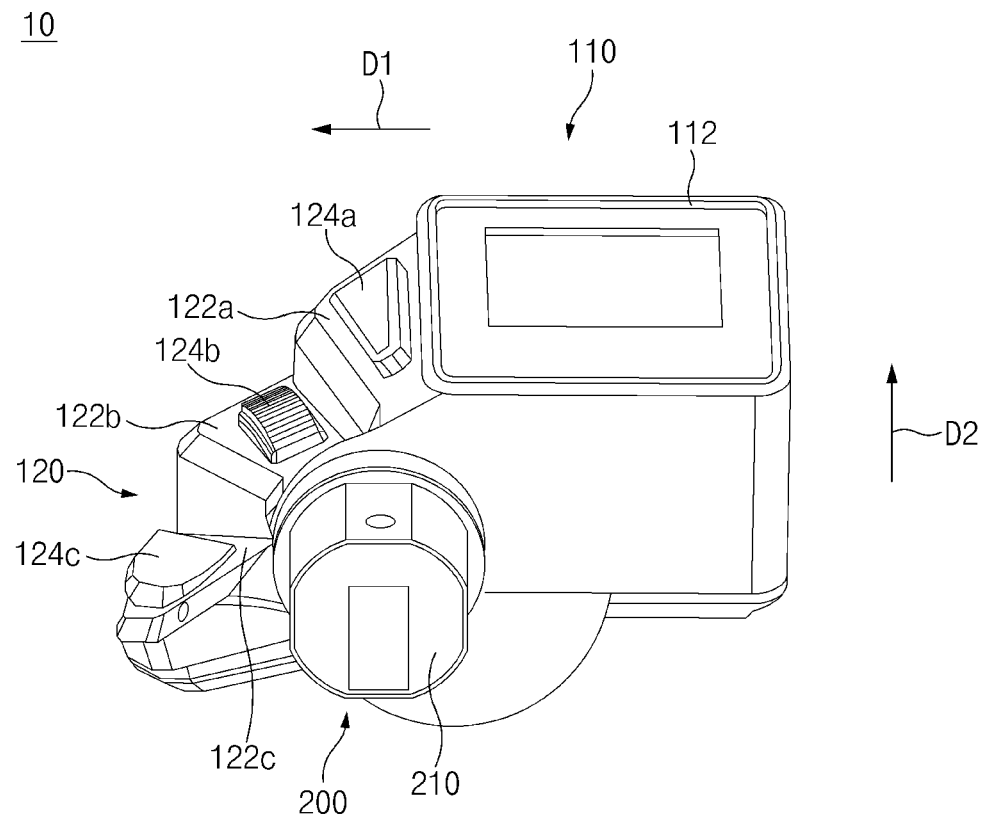
FIG. 3 illustrates a first side view of a controller according to an exemplary embodiment of the present disclosure.
Figure 4:
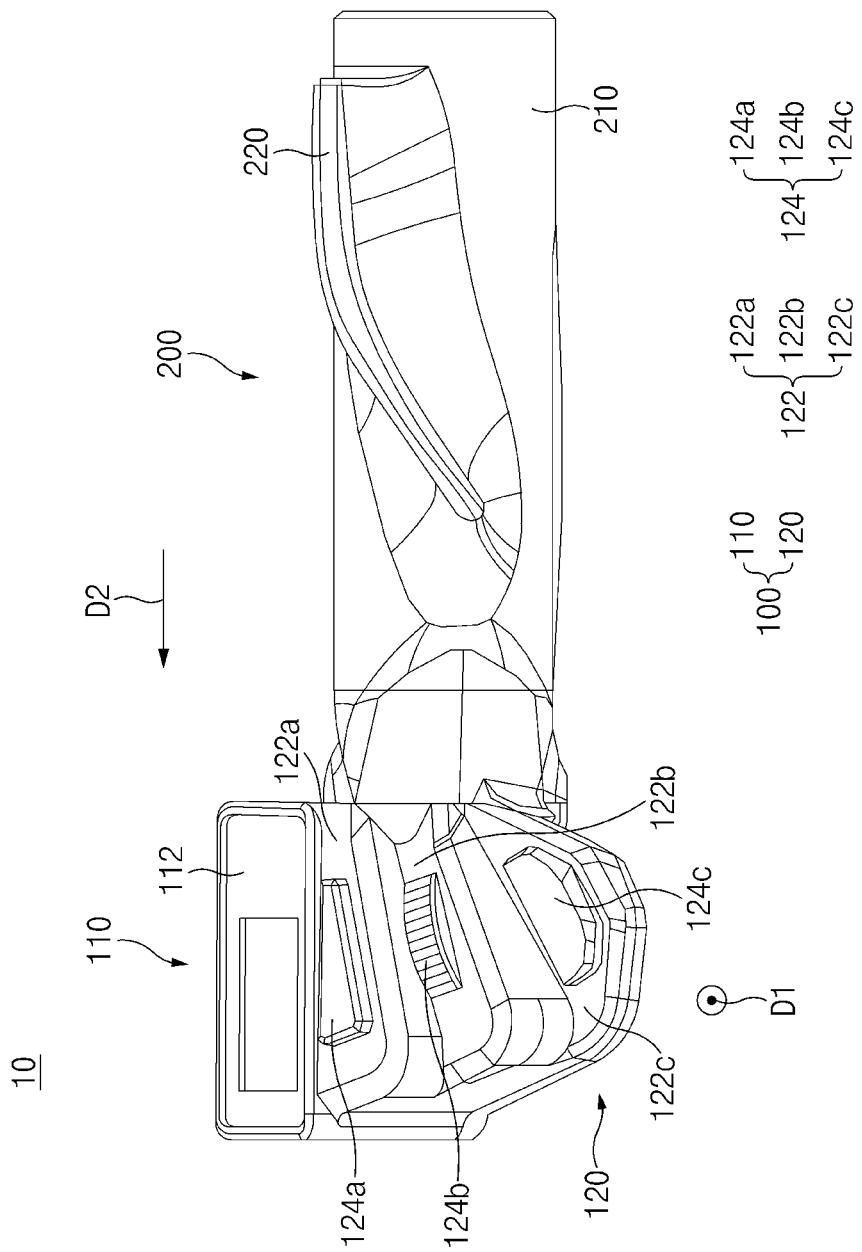
FIG. 4 illustrates a second side view of a controller according to an exemplary embodiment of the present disclosure.

FIG. 1 illustrates a first perspective view of a controller according to an exemplary embodiment of the present disclosure, and FIG. 2 illustrates a second perspective view of a controller according to an exemplary embodiment of the present disclosure. FIG. 3 illustrates a first side view of a controller according to an exemplary embodiment of the present disclosure, and FIG. 4 illustrates a second side view of a controller according to an exemplary embodiment of the present disclosure.

Referring to FIGS. 1 to 4, a controller 10 according to an exemplary embodiment of the present disclosure may include a head part 100 including a display unit 110 having a liquid crystal display (LCD) screen for providing information and images and a button unit 120 having operation buttons 124, and a body part 200 joined to the head part 100. The head part 100 and the body part 200, which are separate components, may be joined and fixed to each other. As described below, since there are a number of cases of joining the head part 100 and the body part 200, the head part 100 and the body part 200 may be joined to each other in a state in which they are optimized for each user by taking the user's body type and the like into consideration.

The display unit 110 may include a display body 112 forming a body of the display unit 110 and having the LCD screen for providing information and images.

Meanwhile, the button unit 120 may include a plurality of stepped areas 122 protruding from a side surface of the display unit 110, and various types of buttons may be provided on top surfaces of the plurality of stepped areas 122.

More specifically, when a horizontal direction in which the stepped areas 122 are spaced apart from the display unit 110 is referred to as a first direction D1, and a direction in which the body part 200 is directed toward the display unit 110 is referred to as a second direction D2, the stepped areas 122 may include a first stepped area 122a extending from the display unit 110, a second stepped area 122b extending from the first stepped area 122a in the first direction D1, and a third stepped area 122c extending from the second stepped area 122b in the first direction D1.

According to an exemplary embodiment of the present disclosure, the buttons 124 may include a first button 124a provided on the top surface of the first stepped area 122a, a second button 124b provided on the top surface of the second stepped area 122*b*, and a third button 124*c* provided on the top surface of the third stepped area 122*c*.

In addition, the second stepped area 122*b* may be stepped downward from the first stepped area 122*a*, and the third stepped area 122*c* may be stepped downward from the second stepped area 122*b*. In addition, the top surfaces of the first to third stepped areas 122*a*, 122*b*, and 122*c* may be inclined downward in the first direction D1 while being inclined downward in the second direction D2. Thus, when a user grips the body part 200 of the controller 10, the user may easily operate the first to third buttons 124*a*, 124*b*, and 124*c* using the thumb.

More preferably, the degree of inclination of the top surface of the third stepped area 122*c* downward in the second direction D2 may be greater than that of the top surface of the second stepped area 122*b*, and the degree of inclination of the top surface of the second stepped area 122*b* downward in the second direction D2 may be greater than that of the top surface of the first stepped area 122*a*. In this case, when the user grips the body part 200 of the controller 10, the ease of operation of the buttons 124 may be maximized.

For example, the top surface of the first stepped area 122*a* may be inclined downward at approximately 0 degree with respect to the second direction D2 (that is, parallel to the second direction D2), the top surface of the second stepped area 122*b* may be inclined downward at approximately 8 degrees with respect to the second direction D2, and the top surface of the third stepped area 122*c* may be inclined downward at approximately 15.5 degrees with respect to the second direction D2.

In addition, for example, an angle between a virtual line connecting the center of an end of the body part 200 in a direction opposite to the second direction D2 and the center of the first button 124*a* and another virtual line parallel to the second direction D2 may be approximately 2 degrees, an angle between a virtual line connecting the center of the end of the body part 200 in the direction opposite to the second direction D2 and the center of the second button 124*b* and another virtual line parallel to the second direction D2 may be approximately 16.5 degrees, and an angle between a virtual line connecting the center of the end of the body part 200 in the direction opposite to the second direction D2 and the center of the third button 124*c* and another virtual line parallel to the second direction D2 may be approximately 32 degrees.

The above-described numerical ranges are not simply selected, and may be intended to significantly improve the user's grip and the ease of operation of the buttons 124 when the user grips the body part 200 of the controller 10.

According to an exemplary embodiment of the present disclosure, the first to third buttons 124*a*, 124*b*, and 124*c* may be different types of buttons. For example, the first button 124*a* may be movable in a vertical direction with respect to the top surface of the first stepped area 122*a*, the second button 124*b* may be a scroll wheel button, and the third button 124*c* may have a hinge structure which is rotatable on a rotation axis. However, the types of the first to third buttons are not limited thereto, and various types of buttons may be provided.

Figure 5:
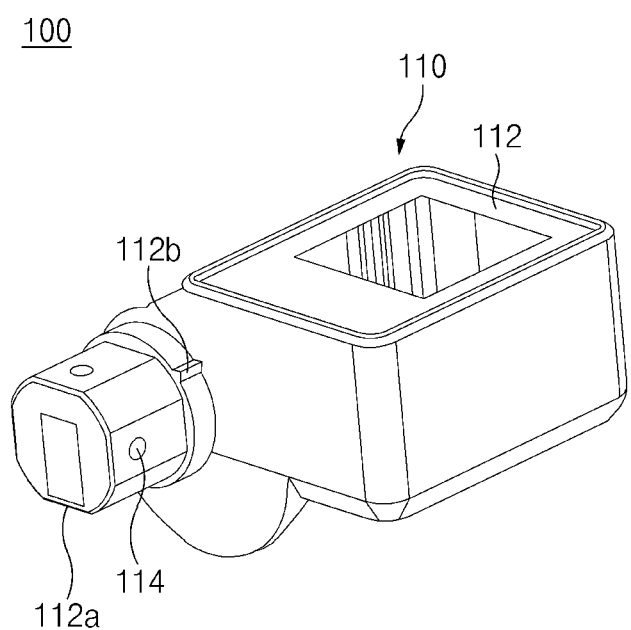
FIG. 5 illustrates a perspective view of a head part of a controller according to an exemplary embodiment of the present disclosure.
Figure 6:
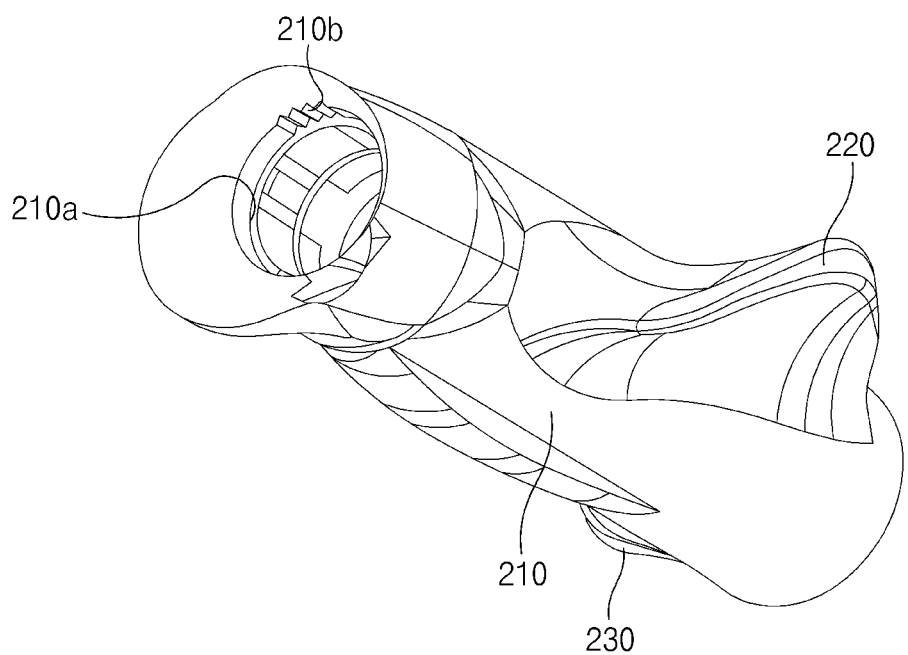
FIG. 6 illustrates a perspective view of a body part of a controller according to an exemplary embodiment of the present disclosure.

FIG. 5 illustrates a perspective view of a head part of a controller according to an exemplary embodiment of the present disclosure, and FIG. 6 illustrates a perspective view of a body part of a controller according to an exemplary embodiment of the present disclosure.

Referring to FIGS. 5 and 6, the display unit 110 may include a projection portion 112*a* protruding from the display body 112 toward the body part 200 and engaged with the body part 200. In addition, the body part 200 may include a main body 210 forming a body of the body part 200 and extending along the second direction D2 (see FIGS. 3 and 4), and a recessed portion 210*a* provided in the main body 210 and into which the projection portion 112*a* is inserted.

Referring to FIGS. 5 and 6, a first uneven portion 112*b* may be provided on an outer circumferential surface of the projection portion 112*a*, and a second uneven portion 210*b* having a shape corresponding to that of the first uneven portion 112*b* may be provided on an inner circumferential surface of the recessed portion 210*a*. According to an exemplary embodiment of the present disclosure, at least one of the first uneven portion 112*b* and the second uneven portion 210*b* may include a plurality of uneven portions.

Since at least one of the first uneven portion 112*b* or the second uneven portion 210*b* includes the plurality of uneven portions, a relative rotation angle between the head part 100 and the body part 200 may be adjusted when the head part 100 and the body part 200 are joined. Thus, the joining of the head part 100 and the body part 200 may be optimized by taking the user's body type, hand shape, and the like into consideration. For example, as illustrated in FIGS. 5 and 6, the second uneven portion 210*b* may include the plurality of uneven portions, and the first uneven portion 112*b* may include a single uneven portion. In this case, the first uneven portion 112*b* may be selectively fitted into any one of the plurality of second uneven portions 210*b* so that the relative rotation angle between the head part 100 and the body part 200 may be adjusted. According to another exemplary embodiment of the present disclosure, the first uneven portion 112*b* may include the plurality of uneven portions, and the second uneven portion 210*b* may include a single uneven portion.

Referring to FIG. 5, the display unit 110 may further include a ball plunger 114 provided on the outer circumferential surface of the projection portion 112*a* of the display body 112 and disposed closer to the body part 200 than the first uneven portion 112*b*. Since the ball plunger is additionally provided on the projection portion 112*a*, the joining between the head part 100 and the body part 200 may be firmly made.

Meanwhile, referring to FIGS. 1 to 6, the body part 200 may include a plurality of protrusions. More specifically, the body part 200 may include a first protrusion 220 provided on a circumferential surface of the main body 210, extending in longitudinal and circumferential directions of the main body 210, and having a spiral shape. When the user grips the body part 200 of the controller 10, the first protrusion 220 may support the user's thumb and be designed to effectively deliver the user's weight to a crutch body of a crutch to be described below. Thus, the first protrusion 220 may have a shape corresponding to that of the thumb when the user grips the body part 200.

In addition, the body part 200 may further include a second protrusion 230 provided on one end portion of the main body 210 in the direction opposite to the second direction D2 and extending along the circumferential direction of the main body 210, and a third protrusion 240 provided on the other end portion of the main body 210 in the second direction D2 and extending along the circumferential direction of the main body 210. The second protrusion 230 and the third protrusion 240 may prevent the body part 200 from slipping from the user's hand when the user grips the body part 200 of the controller 10.

Figure 7:
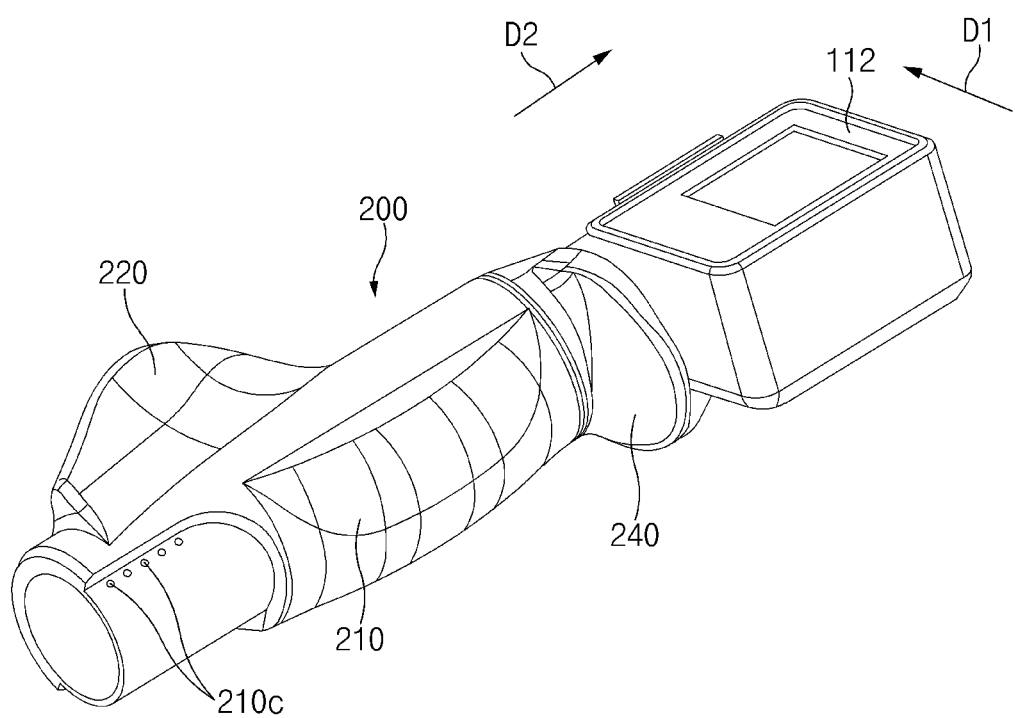
FIG. 7 illustrates a perspective view of a controller according to an exemplary embodiment of the present disclosure, from which a second protrusion is removed.
Figure 8:
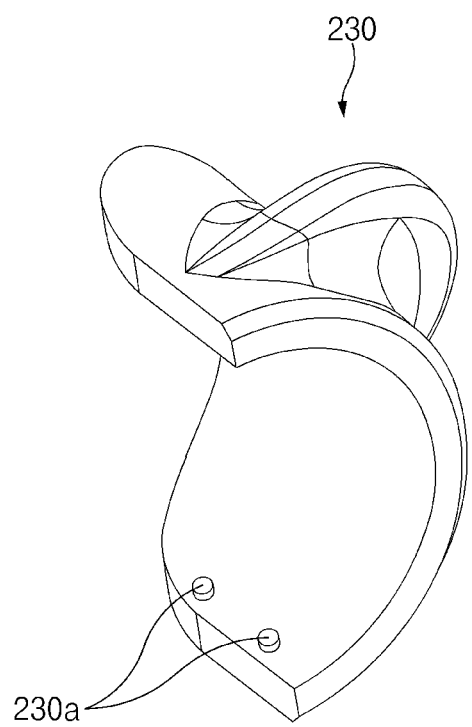
FIG. 8 illustrates a perspective view of a second protrusion detached from a controller according to an exemplary embodiment of the present disclosure.

FIG. 7 illustrates a perspective view of a controller according to an exemplary embodiment of the present disclosure, from which a second protrusion is removed, and FIG. 8 illustrates a perspective view of a second protrusion detached from a controller according to an exemplary embodiment of the present disclosure.

Referring to FIGS. 7 and 8, the second protrusion 230 may be detachably attached to the main body 210. More specifically, the end portion of the main body 210 in the direction opposite to the second direction D2 may have a plurality of recesses 210c arranged in the second direction D2, and the second protrusion 230 may be detachably attached to the main body 210 through the plurality of recesses 210c. More specifically, the second protrusion 230 may include one or more connection members 230a having a protruding shape, and the connection members 230a may be engaged with at least some of the plurality of recesses 210c so that the second protrusion 230 may be fixed to the main body 210.

According to an exemplary embodiment of the present disclosure, since the plurality of recesses 210c are provided in the main body 210, the connection members 230a may be selectively inserted into some of the plurality of recesses 210c. In this case, the controller 10 may provide good grip optimized for each user by taking the user's hand shape and size into consideration.

Crutch

Figure 9:
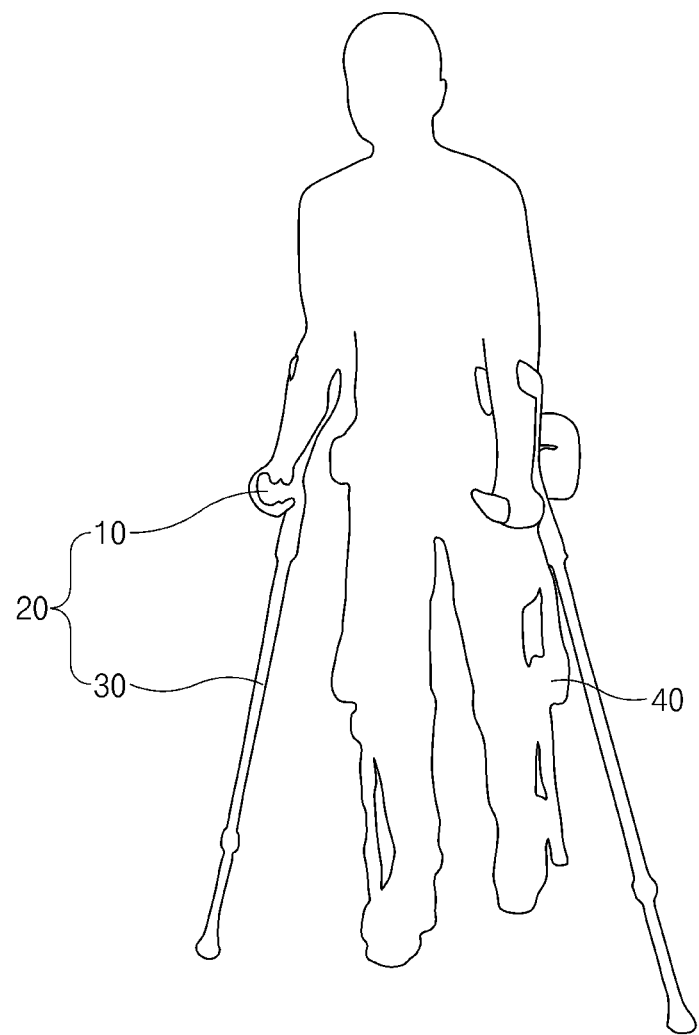
FIG. 9 illustrates a wearable robot according to an exemplary embodiment of the present disclosure, which is worn by a user.

FIG. 9 illustrates a wearable robot according to an exemplary embodiment of the present disclosure, which is worn by a user.

Referring to FIGS. 1 to 9, a crutch 20 according to an exemplary embodiment of the present disclosure may be designed to support the user. Here, the crutch 20 may include the above-described controller 10 and a crutch body 30 forming a body of the crutch 20 and to which the controller 10 is fixed.

In addition, the controller 10 may include the head part 100 including the display unit 110 providing information and images and the button unit 120 having the operation buttons 124, and the body part 200 joined to the head part 100.

In addition, the display unit 110 may include the projection portion 112a engaged with the body part 200, and the body part 200 may include the recessed portion 210a into which the projection portion 112a is inserted.

The first uneven portion 112b may be provided on the outer circumferential surface of the projection portion 112a, and the second uneven portion 210b having a shape corresponding to that of the first uneven portion 112b may be provided on the inner circumferential surface of the recessed portion 210a. In addition, at least one of the first uneven portion 112b or the second uneven portion 210b may include the plurality of uneven portions.

The above description of the controller 10 according to exemplary embodiments of the present disclosure may also be applied to the crutch 20 according to exemplary embodiments of the present disclosure.

Wearable Robot

Referring to FIGS. 1 to 9, a robot according to an exemplary embodiment of the present disclosure may be a wearable robot that can be worn by a human operator (user).

The robot according to an exemplary embodiment of the present disclosure may include the crutch 20 including the controller 10 and the crutch body 30 to which the controller 10 is fixed, and an exoskeleton 40 driven by the operation of the controller 10 and worn by the user. For example, as illustrated in FIG. 9, the exoskeleton 40 may be fitted to the lower half of the user's body.

The controller 10 may have the first button 124a for controlling the operation of the exoskeleton 40, the second button 124b for switching the display of the information, images, and the like on the display unit 110, and the third button 124c for stopping the operation of the exoskeleton 40. However, the function of each button is not limited thereto.

In addition, the above description of the controller 10 and the crutch 20 according to exemplary embodiments of the present disclosure may also be applied to the robot according to exemplary embodiments of the present disclosure.

As set forth above, according to exemplary embodiments of the present disclosure, the controller may have a structure that can be fixed in various forms depending on the user, thereby improving the user's grip and preventing malfunction of the controller.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A controller, comprising:
a head part including a display unit providing information and images and a button unit having a plurality of operation buttons; and
a body part joined to the head part,
wherein the display unit includes a projection portion engaged with the body part,
wherein the body part includes a recessed portion into which the projection portion is inserted,
wherein a first uneven portion is provided on an outer circumferential surface of the projection portion,
wherein a second uneven portion having a shape corresponding to that of the first uneven portion is provided on an inner circumferential surface of the recessed portion,
wherein at least one of the first uneven portion or the second uneven portion includes a plurality of uneven portions,
wherein the button unit protrudes from a side surface of the display unit, the button unit includes a plurality of stepped areas protruding from the side surface of the display unit, and the plurality of operation buttons are provided on top surfaces of the plurality of stepped areas, respectively, and
wherein when a direction in which the stepped areas are spaced apart from the display unit is referred to as a first direction, the stepped areas include:
a first stepped area extending from the display unit;
a second stepped area extending from the first stepped area; and
a third stepped area extending from the second stepped area, and
the plurality of operation buttons include:
a first button provided on the top surface of the first stepped area;
a second button provided on the top surface of the second stepped area; and
a third button provided on the top surface of the third stepped area.

2. The controller according to claim 1, wherein the second uneven portion includes the plurality of uneven portions, and the first uneven portion includes a single uneven portion.

3. The controller according to claim 1, wherein the display unit further includes a ball plunger provided on the outer circumferential surface of the projection portion and disposed closer to the body part than the first uneven portion.

4. The controller according to claim 1, wherein the top surfaces of the first to third stepped areas are inclined downward in the first direction.

5. The controller according to claim 4, wherein the top surfaces of the first to third stepped areas are inclined downward in a second direction in which the body part is directed toward the display unit.

6. The controller according to claim 5, wherein a degree of inclination of the top surface of the third stepped area downward in the second direction is greater than that of the top surface of the second stepped area, and
   a degree of inclination of the top surface of the second stepped area downward in the second direction is greater than that of the top surface of the first stepped area.

7. The controller according to claim 1, wherein the first button is movable in a vertical direction with respect to the top surface of the first stepped area.

8. The controller according to claim 1, wherein the second button is a scroll wheel button.

9. The controller according to claim 1, wherein the third button has a hinge structure which is rotatable on a rotation axis.

10. The controller according to claim 5, wherein the body part includes:
    a main body; and
    a first protrusion provided on a circumferential surface of the main body, extending in longitudinal and circumferential directions of the main body, and having a spiral shape.

11. The controller according to claim 10, wherein the body part further includes a second protrusion provided on one end portion of the main body in a direction opposite to the second direction, and extending along the circumferential direction of the main body.

12. The controller according to claim 11, wherein one end portion of the main body in the direction opposite to the second direction has a plurality of recesses arranged in the second direction, and
    the second protrusion is detachably attached to the main body through the plurality of recesses.

13. The controller according to claim 11, wherein the body part further includes a third protrusion provided on the other end portion of the main body in the second direction, and extending along the circumferential direction of the main body.

14. The controller according to claim 5, wherein the second stepped area is stepped downward from the first stepped area, and the third stepped area is stepped downward from the second stepped area.

15. A crutch for supporting a user, the crutch comprising:
    a controller; and
    a crutch body to which the controller is fixed,
    wherein the controller includes:
    a head part including a display unit providing information and images and a button unit having a plurality of operation buttons; and
    a body part joined to the head part,
    the display unit includes a projection portion engaged with the body part,
    the body part includes a recessed portion into which the projection portion is inserted,
    a first uneven portion is provided on an outer circumferential surface of the projection portion,
    a second uneven portion having a shape corresponding to that of the first uneven portion is provided on an inner circumferential surface of the recessed portion, and
    at least one of the first uneven portion or the second uneven portion includes a plurality of uneven portions,
    wherein the button unit protrudes from a side surface of the display unit, the button unit includes a plurality of stepped areas protruding from the side surface of the display unit, and the plurality of operation buttons are provided on top surfaces of the plurality of stepped areas, respectively, and
    wherein when a direction in which the stepped areas are spaced apart from the display unit is referred to as a first direction, the stepped areas include:
    a first stepped area extending from the display unit;
    a second stepped area extending from the first stepped area; and
    a third stepped area extending from the second stepped area, and
    the plurality of operation buttons include:
    a first button provided on the top surface of the first stepped area;
    a second button provided on the top surface of the second stepped area; and
    a third button provided on the top surface of the third stepped area.

16. A wearable robot, comprising:
    a crutch including a controller, and a crutch body to which the controller is fixed; and
    an exoskeleton driven by the controller and worn by a user,
    wherein the controller includes:
    a head part including a display unit providing information and images and a button unit having a plurality of operation buttons; and
    a body part joined to the head part,
    the display unit includes a projection portion engaged with the body part,
    the body part includes a recessed portion into which the projection portion is inserted,
    a first uneven portion is provided on an outer circumferential surface of the projection portion,
    a second uneven portion having a shape corresponding to that of the first uneven portion is provided on an inner circumferential surface of the recessed portion, and
    at least one of the first uneven portion or the second uneven portion includes a plurality of uneven portions,
    wherein the button unit protrudes from a side surface of the display unit, the button unit includes a plurality of stepped areas protruding from the side surface of the display unit, and the plurality of operation buttons are provided on top surfaces of the plurality of stepped areas, respectively, and
    wherein when a direction in which the stepped areas are spaced apart from the display unit is referred to as a first direction, the stepped areas include:
    a first stepped area extending from the display unit;
    a second stepped area extending from the first stepped area; and
    a third stepped area extending from the second stepped area, and
    the plurality of operation buttons include:
    a first button provided on the top surface of the first stepped area;

a second button provided on the top surface of the second stepped area; and a third button provided on the top surface of the third stepped area.

\* \* \* \* \*